Sept. 1, 1953         J. C. GRAVENO         2,650,963
AUTOMOBILE SIGNAL DEVICE
Filed Sept. 2, 1950

INVENTOR.
JOHN C. GRAVENO
BY
Gustav A. Wolff
ATTORNEY

Patented Sept. 1, 1953

2,650,963

UNITED STATES PATENT OFFICE 2,650,963

AUTOMOBILE SIGNAL DEVICE

John C. Graveno, South Euclid, Ohio, assignor of one-half to Joseph E. Stern, East Cleveland, Ohio Application September 2, 1950, Serial No. 183,057

1 Claim. (Cl. 200—61.89)

The present invention relates to automobile signal devices and more particularly to automatically actuated electric signal devices arranged to automatically, visually indicate on the rear portion of a motor vehicle the adjusted condition of the functional motive means of the vehicle.

It is the primary object of the invention to provide an electric automobile signal device embodying a signal circuit adapted to be fully controlled by the carburetor means of a vehicle to permit visual indication of the cutting off of the gas supply to the engine of such vehicle even though the speed of the vehicle is only slightly decreased.

Another object of the invention is to provide an electric automobile signal device embodying a signal controlling circuit including switching means associated with the throttle control lever of the carburetor of a vehicle to permit visual indication of the cutting off of the gas supply to the engine of a vehicle and proper adjustment of the idle position of the throttle valve of the carburetor without interfering with the proper action of the switching means.

Additional objects and novel features of construction, combinations and relations of parts by which the above and other objects in view have been attained will appear and are set forth in detail in the course of the following specification.

The drawings forming part of the specification illustrate a certain practical embodiment of the invention, but it will be apparent as the specification proceeds that the structure may be modified and changed in various ways without departure from the true spirit and scope of the invention.

Figure 1:
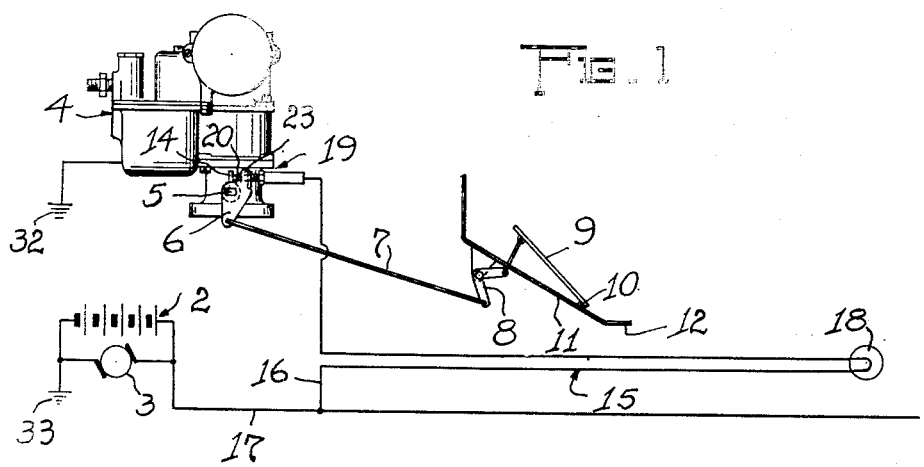
Fig. 1 is a diagrammatic view illustrating the electrical signaling device, its circuit and the means controlling same.
Figure 2:
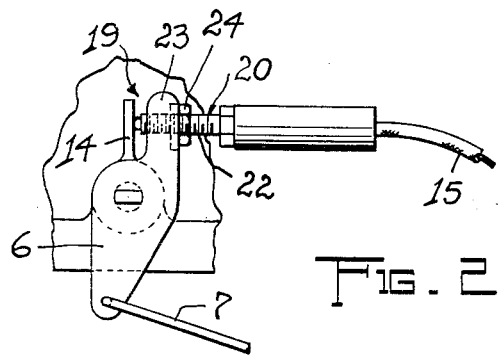
Fig. 2 is an enlarged, fragmentary side view portion of the carburetor disclosed in Fig. 1, the view showing the throttle lever of the carburetor and the idler adjusting screw for the lever which adjusting screw forms the shiftable switch contact of the switch arrangement.
Figure 3:
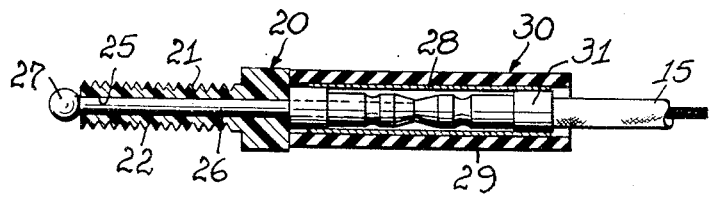
Fig. 3 is a sectional view through the idler adjusting screw and the cable releasably connected therewith.

Referring now more in detail to the exemplified form of the invention shown in the drawings, the automobile signal device disclosed therein includes the usual battery 2 and generator 3 of the customary ignition and lighting system of an automobile, which embodies the customary carburetor 4, the throttle valve shaft 5 of which mounts in the usual manner a lever arm or throttle control arm 6. This control arm is connected by a push rod 7 and a throttle control linkage 8 to an accelerator foot pedal 9 pivoted at 10 to the foot board 11 of the conventional floor board 12. The throttle valve shaft 5, as customary, is yieldingly forced toward a stationary stop 14 to its idle position; that is the position in which the throttle valve is almost closed. This idle position of the throttle valve is commonly adjustable by use of a set screw adjustably threaded into control arm 6.

The present invention utilizes the movement of the throttle control arm 6 to open and close a caution signal circuit 15 which is connected in parallel to the main ignition and lighting circuit of the automobile. Circuit 15 has its lead wire 16 connected to the feed wire 17 of the main circuit and includes an amber light signal lamp 18 and a controlling switch 19 having its shiftable terminal formed by a specially constructed adjustably mounted member 20 which is threadedly engaged with throttle control arm 6 of carburetor 4. The stationary terminal of control switch 19 is formed by stationary stop 14 formed as an integral part of the carburetor. The specially constructed member 20 consists of a set-screw-like tubular body 21 of insulating material which body has its outwardly threaded portion 22 threadedly engaged with the threaded secondary arm 23 of throttle control arm 6 and is secured in adjusted position on said arm by a lock nut member 24. Body 21 mounts in its through passage 25 a metal inset 26 which at its front end is formed with a rounded head portion 27 adapted to provide a contact member and which at its rear end is enlarged to snugly fit a split brass tubing 28 in the tubular body 29 of a coupling member 30 made of insulating material. Tubing 28 electrically connects the metal inset 26 with the contact member 31 at the end of lead wire 16, which contact member is sized to snugly fit tubing 28 in the tubular coupling member 30.

Carburetor 4, battery 2, and generator 3 are grounded at 32 and 33, respectively, so that signal circuit 15 is automatically closed and signal lamp 18 lit up when throttle control arm 6 is in idle position so that current can flow from battery 2 and generator 3 through said circuit 15, through signal lamp 18, control switch 19, and grounds 32 and 33 back to battery 2 and generator 3.

When accelerator foot pedal 9 is pressed downwardly the controlling switch 19 is opened and signal circuit 15 with signal lamp 18 is out of operation when the accelerator is released, that is, when in the operation of a motor vehicle the accelerator is released prior to a braking or similar action, switch 19 is automatically closed and signal circuit 15 restored to light up its signal lamp 18.

It will be apparent that the described simple and fully automatic signal device will warn others on the road whenever a driver in the usual operation of his vehicle takes off the power by releasing the accelerator foot pedal to reduce the speed of the vehicle prior to braking such vehicle. The device, furthermore, permits quick and easy setting or adjusting of the idle positions of the throttle valve without any change in the relative position of the contact members of the switch with respect to such idle portion of the throttle valve.

Having thus described my invention,
What I claim is:

A contact member for a control switch arrangement of a signal circuit of an automotive vehicle embodying an outwardly threaded tubular body of insulating material adapted to be threadedly, axially adjustably mounted on the control arm of the carburetor of the vehicle, and a metal rod non-shiftably extended through said tubular body having one extended end formed to a contact head and the other extended end shaped to permit its electrical connection with the signal circuit to be controlled.

JOHN C. GRAVENO.

References Cited in the file of this patent
UNITED STATES PATENTS

| Number | Name | Date |
|---|---|---|
| 1,729,071 | Gilbert | Sept. 24, 1929 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,260,680 | Nelsen | Oct. 28, 1941 |
| 2,552,665 | Cirone | May 15, 1951 |
| 2,568,610 | Chappell | Sept. 18, 1951 |